United States Patent
Parekh (10) Patent No.: US 10,331,362 B1
(45) Date of Patent: Jun. 25, 2019

(54) ADAPTIVE REPLICATION FOR SEGMENTATION ANCHORING TYPE

(71) Applicant: EMC IP Holding Company LLC, Hopkinton, MA (US)

(72) Inventor: Harshadrai Parekh, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 292 days.

(21) Appl. No.: 15/282,967

(22) Filed: Sep. 30, 2016

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0641* (2013.01); *G06F 3/0643* (2013.01)

(58) Field of Classification Search
CPC ...... G06F 3/0619; G06F 3/067; G06F 3/0643; G06F 3/0641; G06F 3/065
See application file for complete search history.

(56) References Cited

U.S. PATENT DOCUMENTS

| | | | | |
|---|---|---|---|---|
| 5,990,810 A * | 11/1999 | Williams | | G06F 3/0608 341/51 |
| 6,912,645 B2 | 6/2005 | Dorward | | G06F 17/30073 707/999.001 |
| 7,386,663 B2 * | 6/2008 | Cousins | | G06F 17/30067 711/114 |
| 7,600,075 B2 * | 10/2009 | Cousins | | G06F 17/30067 711/114 |
| 7,937,528 B2 * | 5/2011 | Cousins | | G06F 17/30067 711/114 |
| 8,037,032 B2 * | 10/2011 | Pershin | | G06F 11/1451 707/602 |
| 8,046,509 B2 * | 10/2011 | Bondurant | | G06F 3/0608 710/62 |
| 8,117,410 B2 * | 2/2012 | Lu | | G06F 11/1451 707/625 |
| 8,127,109 B2 * | 2/2012 | Matze | | G06F 3/0608 711/112 |
| 8,176,018 B1 * | 5/2012 | Bisson | | G06F 17/30144 707/690 |
| 8,176,292 B2 * | 5/2012 | Tofano | | G06F 17/30156 711/170 |
| 8,205,065 B2 * | 6/2012 | Matze | | G06F 3/0608 711/112 |
| 8,321,648 B2 * | 11/2012 | Condict | | G06F 3/0608 711/114 |

(Continued)

*Primary Examiner* — Christopher D Birkhimer
(74) *Attorney, Agent, or Firm* — Womble Bond Dickinson (US) LLP (57) ABSTRACT

Described is a system for identifying data that may differ between files used as part of a replication process. The system may determine a type of segmentation used for segmenting data such as a variable size segmentation or a fixed size segmentation is used. Based on the segmentation of a file, the system may identify segments that may be modified. For example, the system may identify only the particular modified segments within a boundary when a fixed size segmentation is used identify all of the segments within a boundary as modified when a variable segmentation is used. Accordingly, depending on the scenario, the system may determine an efficient mechanism for identifying data to send to a target storage as part of a replication process.

20 Claims, 6 Drawing Sheets

Comparison of Alignment Between 572a and 572b

(56) References Cited

U.S. PATENT DOCUMENTS

| | | | | |
|---|---|---|---|---|
| 8,356,174 B2* | 1/2013 | Schwaab | G06F 11/1451 | 705/50 |
| 8,407,382 B2* | 3/2013 | Bondurant | G06F 3/0608 | 710/62 |
| 8,452,731 B2* | 5/2013 | Preslan | G06F 11/1453 | 707/652 |
| 8,452,732 B2* | 5/2013 | Yakushev | G06F 3/0608 | 707/654 |
| 8,463,871 B1* | 6/2013 | Tormasov | G06F 11/1464 | 709/219 |
| 8,468,137 B2* | 6/2013 | Baptist | G06F 11/1004 | 707/652 |
| 8,607,017 B2* | 12/2013 | Condict | G06F 3/0608 | 711/114 |
| 8,612,392 B2* | 12/2013 | Yakushev | G06F 3/0608 | 707/654 |
| 8,615,489 B2* | 12/2013 | Pershin | G06F 11/1451 | 703/21 |
| 8,719,286 B1* | 5/2014 | Xing | G06F 11/1451 | 707/755 |
| 8,751,515 B1* | 6/2014 | Xing | G06F 17/30073 | 707/755 |
| 8,769,055 B2* | 7/2014 | Murphy | G06F 11/1451 | 707/634 |
| 8,799,226 B2* | 8/2014 | Haselton | G06F 11/1451 | 707/654 |
| 8,825,985 B2* | 9/2014 | Jayaraman | H04L 67/06 | 711/154 |
| 8,943,282 B1* | 1/2015 | Armangau | G06F 17/30088 | 711/126 |
| 8,996,830 B1* | 3/2015 | Goldobin | G06F 3/065 | 711/161 |
| 9,026,737 B1* | 5/2015 | Armangau | G06F 12/0822 | 711/118 |
| 9,104,331 B2 | 8/2015 | Hsu | G06F 11/1438 | |
| 9,110,603 B2* | 8/2015 | Yakushev | G06F 3/0608 | |
| 9,110,604 B2* | 8/2015 | Hsu | G06F 3/0655 | |
| 9,110,792 B1* | 8/2015 | Douglis | G06F 12/0269 | |
| 9,110,898 B1* | 8/2015 | Chamness | G06F 17/30002 | |
| 9,135,123 B1* | 9/2015 | Armangau | G06F 11/1471 | |
| 9,152,642 B2* | 10/2015 | Harrison | G06F 17/30091 | |
| 9,235,535 B1* | 1/2016 | Shim | G06F 12/16 | |
| 9,292,327 B1* | 3/2016 | von Thenen | G06F 11/1451 | |
| 9,298,392 B2* | 3/2016 | Hsu | G06F 3/0655 | |
| 9,348,514 B2* | 5/2016 | Fornander | G06F 3/0608 | |
| 9,348,702 B2* | 5/2016 | Hsu | G06F 11/1438 | |
| 9,367,559 B1* | 6/2016 | Zhang | G06F 11/1451 | |
| 9,372,757 B2* | 6/2016 | Cantwell | G06F 11/1451 | |
| 9,377,953 B2* | 6/2016 | Fornander | G06F 3/0608 | |
| 9,384,254 B2* | 7/2016 | Tekade | G06F 17/30581 | |
| 9,389,965 B1* | 7/2016 | Douglis | G06F 12/0269 | |
| 9,405,776 B2* | 8/2016 | Preslan | G06F 11/1453 | |
| 9,449,008 B1* | 9/2016 | Oikarinen | G06F 17/30292 | |
| 9,558,073 B2* | 1/2017 | Cantwell | G06F 11/1451 | |
| 9,916,203 B1* | 3/2018 | Pogde | G06F 11/1451 | |
| 2003/0018878 A1* | 1/2003 | Dorward | G06F 17/30073 | 711/216 |
| 2003/0177149 A1* | 9/2003 | Coombs | G06F 11/1469 | |
| 2003/0188114 A1* | 10/2003 | Lubbers | G06F 11/2058 | 711/162 |
| 2005/0257083 A1* | 11/2005 | Cousins | G06F 17/30067 | 714/6.2 |
| 2007/0198609 A1* | 8/2007 | Black | G06Q 10/087 | |
| 2008/0104146 A1* | 5/2008 | Schwaab | G06F 11/1451 | |
| 2008/0263089 A1* | 10/2008 | Cousins | G06F 17/30067 | |
| 2009/0013129 A1* | 1/2009 | Bondurant | G06F 3/0608 | 711/115 |
| 2010/0049930 A1* | 2/2010 | Pershin | G06F 11/1451 | 711/162 |
| 2010/0076934 A1* | 3/2010 | Pershin | G06F 11/1451 | 707/640 |
| 2010/0077165 A1* | 3/2010 | Lu | G06F 11/1451 | 711/162 |
| 2010/0106691 A1* | 4/2010 | Preslan | G06F 11/1453 | 707/674 |
| 2010/0174684 A1* | 7/2010 | Schwaab | G06F 11/1451 | 707/655 |
| 2010/0205231 A1* | 8/2010 | Cousins | G06F 17/30067 | 707/823 |
| 2010/0274765 A1* | 10/2010 | Murphy | G06F 11/1451 | 707/652 |
| 2011/0106769 A1* | 5/2011 | Baptist | G06F 11/1004 | 707/652 |
| 2011/0225385 A1* | 9/2011 | Tofano | G06F 17/30156 | 711/170 |
| 2011/0276543 A1* | 11/2011 | Matze | G06F 3/0608 | 707/692 |
| 2012/0030477 A1* | 2/2012 | Lu | G06F 11/1453 | 713/189 |
| 2012/0036319 A1* | 2/2012 | Bondurant | G06F 3/0608 | 711/111 |
| 2012/0078852 A1* | 3/2012 | Haselton | G06F 11/1451 | 707/654 |
| 2012/0290537 A1* | 11/2012 | Smith | G06F 3/0608 | 707/654 |
| 2012/0290546 A1* | 11/2012 | Smith | G06F 3/0608 | 707/700 |
| 2013/0091111 A1* | 4/2013 | Tofano | G06F 17/30156 | 707/700 |
| 2013/0246366 A1* | 9/2013 | Preslan | G06F 11/1453 | 707/652 |
| 2013/0339297 A1* | 12/2013 | Chen | G06F 17/30581 | 707/624 |
| 2013/0339302 A1* | 12/2013 | Zhang | G06F 17/30581 | 707/649 |
| 2013/0339303 A1* | 12/2013 | Potter | G06F 17/30581 | 707/649 |
| 2013/0339319 A1* | 12/2013 | Woodward | G06F 17/30581 | 707/692 |
| 2013/0339643 A1* | 12/2013 | Tekade | G06F 17/30581 | 711/162 |
| 2014/0095816 A1* | 4/2014 | Hsu | G06F 3/0655 | 711/162 |
| 2014/0095817 A1* | 4/2014 | Hsu | G06F 11/1438 | 711/162 |
| 2014/0149699 A1* | 5/2014 | Yakushev | G06F 3/0608 | 711/162 |
| 2014/0279956 A1* | 9/2014 | Trimble | G06F 3/0641 | 707/692 |
| 2014/0337295 A1* | 11/2014 | Haselton | G06F 11/1451 | 707/646 |
| 2015/0112939 A1* | 4/2015 | Cantwell | G06F 11/1451 | 707/646 |
| 2015/0142745 A1* | 5/2015 | Tekade | G06F 11/1451 | 707/646 |
| 2015/0142748 A1* | 5/2015 | Gottemukkula | G06F 11/1451 | 707/649 |
| 2015/0142750 A1* | 5/2015 | Mutalik | G06F 11/1451 | 707/654 |
| 2015/0143063 A1* | 5/2015 | Mutalik | G06F 11/1451 | 711/162 |
| 2015/0161153 A1* | 6/2015 | Gheith | G06F 17/30091 | 707/695 |
| 2015/0161154 A1* | 6/2015 | Gheith | G06F 17/30091 | 707/705 |
| 2015/0220402 A1* | 8/2015 | Cantwell | G06F 11/1451 | 707/646 |
| 2015/0242478 A1* | 8/2015 | Cantwell | G06F 17/30575 | 707/634 |
| 2015/0244795 A1* | 8/2015 | Cantwell | G06F 17/30575 | 709/202 |
| 2015/0261776 A1* | 9/2015 | Attarde | G06F 17/30156 | 707/664 |
| 2015/0309733 A1* | 10/2015 | Fornander | G06F 3/0608 | 711/114 |
| 2015/0309746 A1* | 10/2015 | Fornander | G06F 3/0608 | 711/114 |
| 2015/0317209 A1* | 11/2015 | Hsu | G06F 11/1438 | 707/646 |

(56) References Cited

U.S. PATENT DOCUMENTS

| | | | |
|---|---|---|---|
| 2015/0317216 A1* | 11/2015 | Hsu .................. | G06F 3/0655 707/679 |
| 2016/0034492 A1* | 2/2016 | Harrison .......... | G06F 17/30091 707/652 |
| 2016/0077926 A1* | 3/2016 | Mutalik ............. | G06F 11/1456 711/162 |
| 2016/0139849 A1* | 5/2016 | Chaw ................. | G06F 3/0641 711/119 |
| 2016/0154588 A1* | 6/2016 | Rao .................. | G06F 17/30156 711/162 |
| 2016/0170666 A1* | 6/2016 | Hsu .................. | G06F 3/0655 711/162 |

* cited by examiner

ADAPTIVE REPLICATION FOR SEGMENTATION ANCHORING TYPE

TECHNICAL FIELD

Embodiments of the present disclosure relate generally to data storage systems. More particularly, embodiments of the disclosure relate to replicating data from a source storage system to a target storage system.

BACKGROUND

File system replication enables recovery of data in situations where data has been destroyed, inadvertently or otherwise. Conventional replicating systems support four replication types which are designed to deal with network interruptions that are common in the wide area network and recover gracefully with very high data integrity and resilience, ensuring that the replicated data is in a stable state. The first type of replication, directory replication, transfers modified deduplicated data of any file or subdirectory within a source system directory that has been configured as a replication source to a directory on a target system that has been configured as a replication target. Directory replication offers flexible replication topologies including system mirroring, bi-directional, many-to-one, one-to-many, and cascaded, resulting in efficient cross-site deduplication. The second type of replication, managed file replication, directly transfers a backup image from a source system to a target system, one at a time upon request from an administrator. This type of replication provides the same cross-site deduplication effects and flexible network deployment topologies as directory replication. The third type of replication, MTree replication, is designed to replicate MTrees between storage systems. MTrees are user-defined logical partitions of the storage systems that enable granular management of the file system. MTree replication creates periodic snapshots at a source system and sends the differences between two consecutive snapshots to a target storage system. MTree replication supports all the topologies supported by directory replication. The fourth type of replication, collection replication, performs whole-system mirroring in a one-to-one topology, continuously transferring changes in the underlying collection (i.e., a set of deduplicated data segments stored on disk) to the target storage system.

Traditionally, backup systems are optimized by only replicating portions of files that have been modified. In such systems, data files are segmented and stored in segment trees. For example, each data file may be represented by a segment tree. Each segment tree includes one or more levels of segments, such that a segment at one level is further segmented into multiple segments which are stored at a lower level. When replication of a file is to be performed, the source storage system traverses the segment tree representing the file to determine which segment(s) have been modified by comparing the segments against segments of a segment tree at a target storage system that represents the same file.

In some storage systems, segmenting the file may occur using various segmentation algorithms. Certain algorithms, however, may not always be the most efficient depending on the application. For example, some algorithms may provide benefits in terms of providing a flexible segmentation structure. The algorithms, however, may incur additional processing during the replication process. Accordingly, there is a need to maintain the flexibility of certain segmentation structures while minimizing the additional processing the structures may incur during replication.

BRIEF DESCRIPTION OF THE DRAWINGS

Embodiments of the disclosure are illustrated by way of example, and not by way of limitation, in the figures of the accompanying drawings in which like reference numerals refer to similar elements.

DETAILED DESCRIPTION

Described is a system and technique for collecting and analyzing memory usage information of one or more devices. Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

According to some embodiments, a data object, such as a file, is stored on a source storage system and the data object is represented by a segment tree that includes one or more levels of segments (e.g., deduplicated segments). In some embodiments, each level of the segment tree includes one or more segments of the file. Each segment of a level is further segmented into multiple segments and stored at a lower level of the same segment tree. In one embodiment, fingerprints are generated for each segment using a collision-resistant hash function, e.g., a SHA-1 hash. Replication or migration of the data object from the source storage system to a target storage system is then initiated.

In one embodiment, described is a system (and technique) for identifying data that may differ between files used as part of a replication process. The system may determine a type of segmentation used for segmenting data. For example, the system may determine whether a variable size segmentation or a fixed size segmentation is used. In one embodiment, the system may determine the type of segmentation used based on an attribute associated with the file. Based on the segmentation of a file, the system may identify segments that may be modified. For example, the system may be able to identify only the particular modified segments within a boundary when a fixed size segmentation is used based on the segments maintaining an alignment within the boundary. In contrast, when a variable size segmentation is used, the system may identify all of the segments within a boundary as modified. Accordingly, depending on the scenario, the system may determine an efficient mechanism for identifying data to send to a target storage as part of a replication process.

Figure 1:
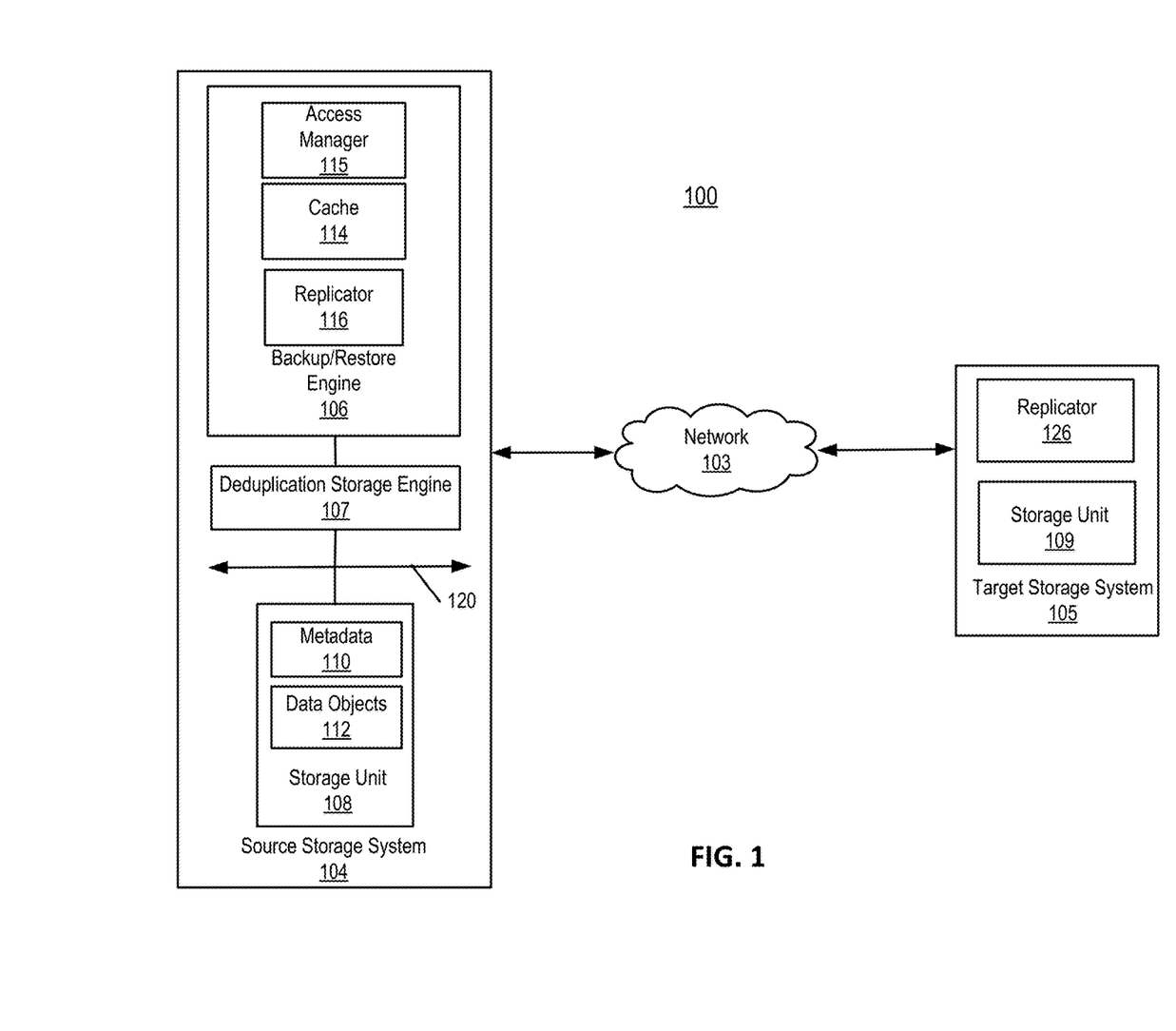
FIG. 1 is a block diagram illustrating an example storage system according to one embodiment of the disclosure.

Referring now to the Figures in which like numerals represent the same or similar elements, and initially to FIG. 1, which is a block diagram illustrating a storage system according to one embodiment of the disclosure. Referring to FIG. 1, system 100 includes, but is not limited to, source storage system 104 communicatively coupled to target storage system 105 over network 103. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage systems 104-105 may include any type of server or cluster of servers (e.g., cloud servers). For example, source storage system 104 may be a storage server used for any of various different purposes, such as to provide multiple users with access to shared data and/or to back up mission critical data. Source storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Source storage system 104 may have a distributed architecture, or all of its components may be integrated into a single unit. Source storage system 104 may be implemented as part of an archive and/or backup system such as a deduplicating storage system available from EMC® Corporation of Hopkinton, Mass.

In one embodiment, source storage system 104 includes, but is not limited to, backup/restore engine 106, deduplication storage engine 107, and storage unit 108 communicatively coupled to each other. Storage unit 108 may be implemented locally (e.g., single node operating environment) or remotely (e.g., multi-node operating environment) via interconnect 120, which may be a bus and/or a network. In one embodiment, storage unit 108 operates as an active storage to receive and store external or fresh user data. Storage unit 108 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage unit 108 may also be combinations of such devices. In the case of disk storage media, the storage unit 108 may be organized into one or more volumes of Redundant Array of Inexpensive Disks (RAID).

In response to a data file to be stored in storage unit 108, deduplication storage engine 107 is configured to segment the data file into multiple segments according to a variety of segmentation policies or rules. Deduplication storage engine 107 may choose not to store a segment in a storage unit if the segment has been previously stored in the storage unit. In the event that deduplication storage engine 107 chooses not to store the segment in the storage unit, it stores metadata enabling the reconstruction of the file using the previously stored segment. As a result, segments of data files are stored in a deduplicated manner within storage unit 108. Data stored in the storage unit may be stored in a compressed form (e.g., lossless compression: Huffman coding, Lempel-Ziv Welch coding; delta encoding: a reference to a segment plus a difference; etc.).

The metadata, such as metadata 110, may be stored in storage unit 108, such that files can be accessed independent of another storage unit. Metadata of each storage unit includes enough information to provide access to the files it contains. In one embodiment, metadata may include fingerprints contained within data objects 112, where a data object may represent a data segment, a compression region (CR) of data segments, or a container of one or more CRs. Fingerprints are mapped to a particular data object via metadata 110, enabling the system to identify the location of the data object containing a segment represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, the source storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the disclosure. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, according to one embodiment, backup engine 106 includes cache 114, access manager 115, and replicator 116. Access manager 115 is to provide file services to a variety of clients, such as a backup/restore application, to backup files stored in storage unit 108, in this example, represented as data objects 112 that are deduplicated by deduplication storage engine 107. Typically, when a request is received to access a file such as a backup file, data objects of the requested file are loaded into a memory of source storage system 104. Since the file may be large, only a portion of data objects of the file is loaded or cached in the memory at a time for accessing.

In one embodiment, replicator 116 is responsible for replicating, i.e., archiving, data stored on storage unit 108 onto a target storage system. For example, replicator 116 may be configured to replicate data on storage unit 108 onto target storage system 105. It will be appreciated, however, that system 100 is not limited to replicating data from one source storage to another one target storage. For instance, replicator 126 of target storage system may also be configured to replicate data on storage unit 109 onto storage unit 108, in which case storage system 105 acts as the "source" and system 104 acts as the "target". For the sake of simplicity, throughout the description replication shall be discussed in the context of storage system 104 and storage system 105 as source and target, respectively.

According to one embodiment, replicators 116 and 126 are configured to manage a segment tree for each file stored on their respective storage units. In one embodiment, source storage system 104 and target storage system 105 may be configured to utilize different formats (e.g., different sizes of segments, tree structures, compression methods, etc.). In such an embodiment, replicator 116 is configured to translate/resegment the segments from its local format to the format being used by target storage system 105. In one aspect of such an embodiment, replicators 116 and 126 are configured to communicate with each other and exchange information regarding the format being utilized. In an embodiment where segment resegmenting is necessary, replicator 116 may fetch segments from its storage unit and store them in a buffer, e.g., cache 114, and resegment them online (i.e., on the fly) as they are dequeued from the buffer, and send the resegmented segments to target storage system 105.

Figure 2:
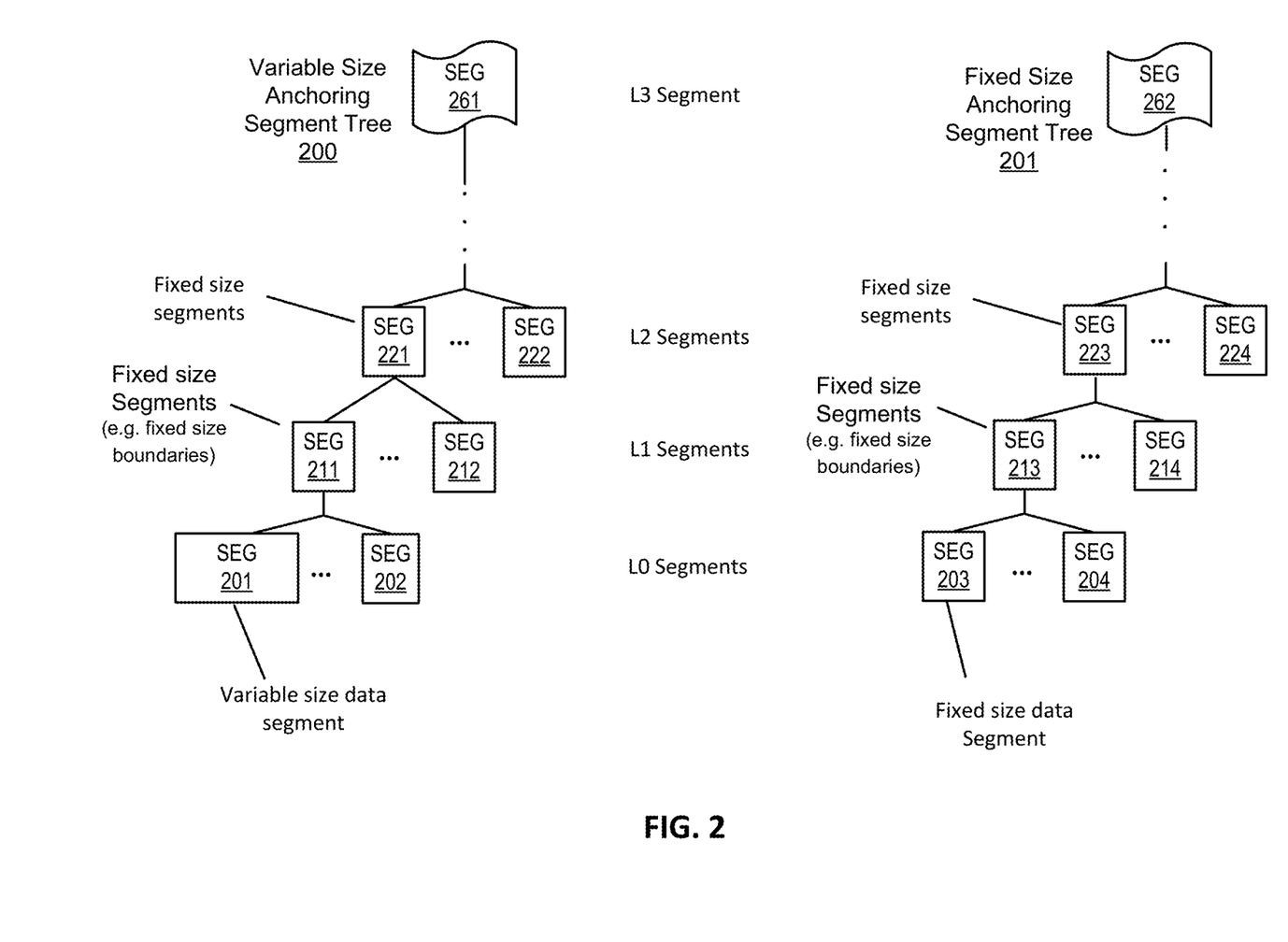
FIG. 2 illustrates a general structure of segment trees according to embodiments of the disclosure.

FIG. 2 is a block diagram illustrating segment trees according to an embodiment of the disclosure. Shown is a variable size anchoring segment tree 200 and a fixed size anchoring segment tree 201. Segment trees 200 and 201 include multiple hierarchies/levels of segments of a file, each level including segments that are further segmented into two or more segments of a lower level. For example, Segment tree 200 includes four levels: L3, L2, L1, and L0. L3 includes one segment 261 representing an entire file, a directory of one or more files, or a virtual machine, stored on the system; L3 segment 261 is segmented into two or more L2 segments (e.g., L2 segments 221-222); each L2 segment, in turn, is segmented into two or more L1 segments (e.g., L1 segments 211-212), and each L1 segment is further segmented into two or more L0 segments (e.g., L0 segments 201-202). Accordingly, in one embodiment, the L0 segments may be referred to as data segments (e.g. represent the actual data of a file), and L1-L3 segments may be referred to as metadata segments (e.g. represent fingerprints of a lower level of data).

Segment tree 201 has a format that is similar to segment tree 200. For instance, segment tree 201 includes four levels: L3, L2, L1, and L0. L3 includes one segment 262 representing an entire file stored on the system; L3 segment 262 is segmented into two or more L2 segments (e.g., L2 segments 223-224); each L2 segment, in turn, is segmented into two or more L1 segments (e.g., L1 segments 213-214), and each L1 segment is further segmented into two or more L0 segments (e.g., L0 segments 203-204).

In one embodiment, variable size anchoring segment tree 200 and fixed size anchoring segment tree 201 differ with respect to type of segmentation used for L0 segments (e.g. data segments). For example, as shown the variable size anchoring segment tree 200 includes variable size segments for the data segments including segment 201, which is larger than segment 202. In other words, each L0 segment in segment tree 200 may have a different size. In contrast, as shown the fixed size anchoring segment tree 201 includes fixed size (e.g. uniform size) segments for data segments 203 and 204. In one embodiment, where the sizes of the L0 segments (e.g. data segments) are different in segment trees 200 and 201, the L1 segments (e.g. metadata segments) may still be fixed at a particular size (e.g., fixed at 4-megabyte (MB) boundaries).

In one embodiment, a fingerprint is generated for each segment of the segment tree, e.g., by using a collision-resistant hash function such as SHA-1 hash function. In such an embodiment, the fingerprints are arranged/structured in a format that is identical to its segment tree format. In one embodiment, in order to optimize the backup process, replication is only performed on segments that have been modified since the last replication. In order to determine if a file on a source storage system has been modified since the last replication, each fingerprint on the source storage system is compared against a corresponding fingerprint on a local basefile or a file on the target storage system. In one embodiment, fingerprint comparison is performed by replicator 116 starting at the highest level, e.g., level L3 and descends down each branch that includes a mismatched fingerprint.

By way of example, assume that replication of either segment tree 200 (or segment tree 201) has been initiated, and a data chunk/segment corresponding to L0 segment 201 (or 203) has changed since the last replication. In such a scenario, a new fingerprint would be generated for L0 segment 201 (or 203), which would have a ripple effect up the segment tree, causing L1 segment 211 (or 213), L2 segment 221 (or 223), and L3 segment 261 (or 262), to all have new fingerprints. In this example, the replicator 116 (or system 100) compares L3 fingerprints of 200 and 201 with a previous segment tree 200' and 201' respectively that may, for example, represent a backup copy of the file or a basefile, and determines that they are different, indicating the file has been modified since the last replication. However, rather than replicating the entire segment tree, replicator 116 compares the L2 segments of the source and target segment trees. In this example, replicator determines that L2 segments 221 and 221' (or 213 and 213') are different, but L2 segments 222 and 222' (or 224 and 224') are the same. Thus, replicator 116 descends down the mismatched branch of the tree and compares L1 segment 211 (or 213) against L1 segment 211' (or 213'), and L1 segment 212 (or 213) against L2 segment 212' (or 213'). In these examples, replicator 116 determines that L1 segments 211 and 211' are mismatched (or 213 and 213' are mismatched), while L1 segments 212 and 212' match (or 214 and 214' match). Replicator 116 continues to descend down the mismatched branch of the trees and compares L0 segment 201 against 201' (or 203 against 203'), and L0 segment 202 against 202' (or 204 and 204'). In this example, replicator 116 determines that L0 segments 201 and 201' are different (or 203 and 203' are different), while L0 segments 202 and 202' match (or 204 and 204' match). As a result, replicator 116 replicates mismatched L3 segment 261, L2 segment 221, L1 segment 211, and L0 segment 201 (or 262, 223, 213, and 203), by sending them to the target storage system.

As shown, the L0 segments may be a fixed size in segment tree 201. One advantage of a fixed segment size is efficiency. A system can create fixed-size blocks in the usual way and a deduplication process can then be applied to deduplicate those fixed-size blocks or segments. This approach is effective at deduplicating whole files that may be similar because every block of similar files will be similar. For example, this approach may be more efficient when datasets use fixed size anchoring such as for a logical unit number (LUN) based backups that designate an individual or collection of physical or virtual storage devices that execute input/output (I/O) commands with a host computer. Moreover, when updating data, a system may be able to identify to precise number of segments that need to be updated.

Figure 3A:
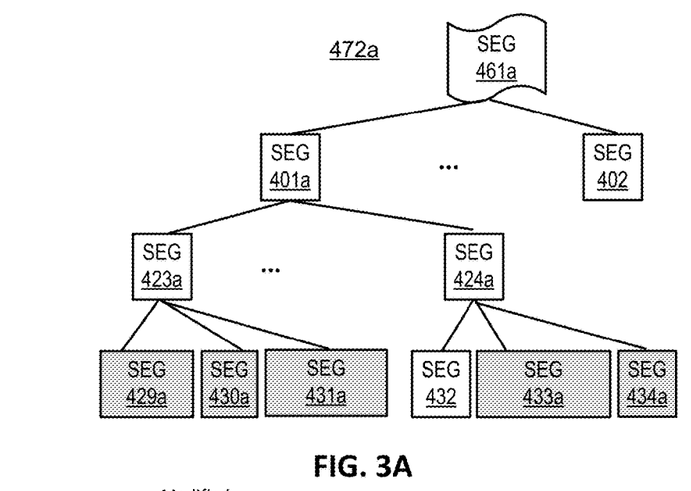
FIG. 3A illustrates an example segment tree that uses a variable size segmentation according to an embodiment of the disclosure.
Figure 3B:
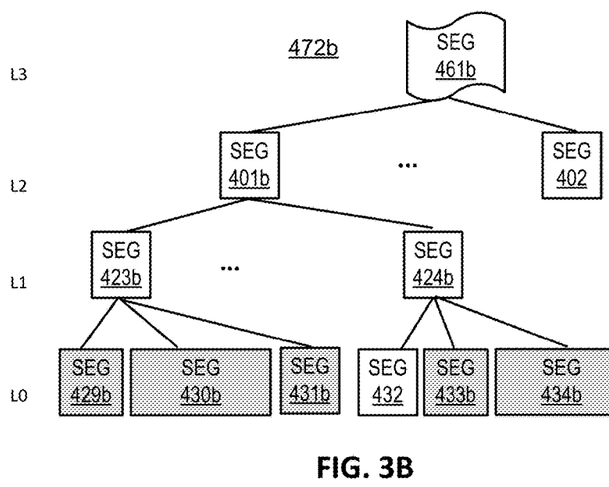
FIG. 3B illustrates an example modified segment tree of FIG. 3A according to an embodiment of the disclosure.
Figure 3C:
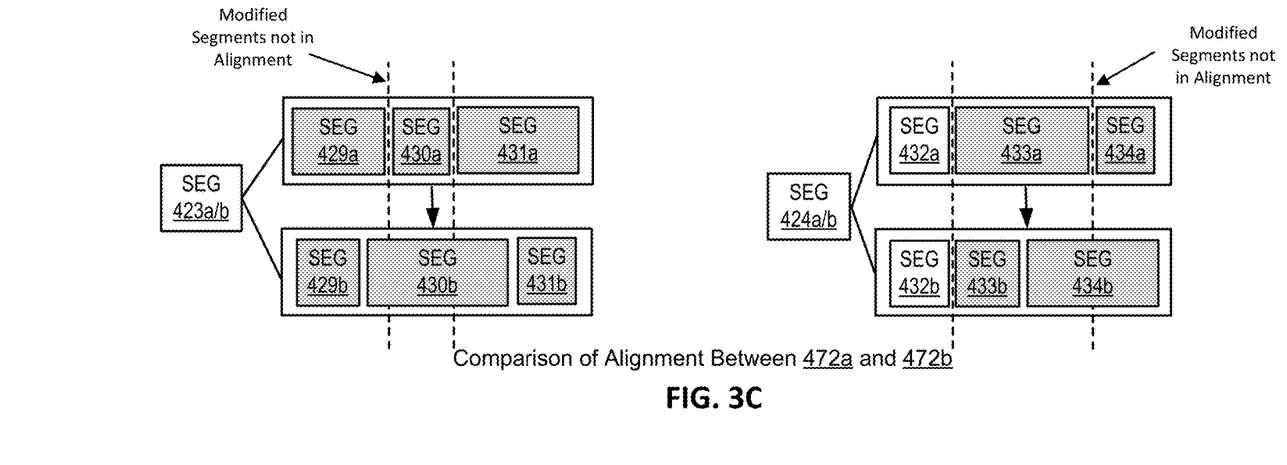
FIG. 3C illustrates an example alignment between segments within a fixed boundary using a variable size segmentation according to an embodiment of the disclosure.

In contrast, when a variable segment size is used in some scenarios, the data may shift and become misaligned. Accordingly, when the system determines that data has been modified within a fixed boundary of a variable size implementation (e.g. L1 segment 211), the system may treat all data within a fixed boundary (e.g. segment 211) as modified. Variable size segmentation, however, does have benefits in certain circumstances. For example, Accordingly, there are instances where the system indicates certain data as modified as a false positive. Such a misalignment is described by way of example in FIGS. 3A-3C. FIGS. 3A-3C are block diagrams illustrating an update to a segment tree of an implementation using variable size segmentation according to an embodiment of the disclosure. FIG. 3A illustrates segment tree 472a that uses a variable size segmentation (or anchoring), and FIG. 3B illustrates segment tree for 472b that represents an update to the segment tree 472a. For example, segment tree 472a may represent a backup copy of data and segment tree 472b may represent a current version of data as modified. As shown, data segments 429a, 430a, 431a of segment 423a have been modified in a manner that has changed their size as shown in 429b, 430b, 431b of segment 423b. As shown, because segment 429a has been modified, the remaining data segments in the boundary (e.g. segment 423a) may be considered modified by the system due to the misalignment. Similarly, segments 433a, and 434a of segment 424a have been modified in manner that has changed their size as shown in segments 433b, and 434b of segment 424b. Accordingly, as shown in FIG. 3C, due to variable sized segments, the data segments proceeding a modified segment are no longer in alignment. Thus, as further described herein, the system may assume that each of the segments (or all of the data) proceeding a modified segment within the fixed boundary of 423 and 424 have been modified. Accordingly, segments 429b-431b, and 433b-434b are sent to the target storage system during the replication process.

Figure 4A:
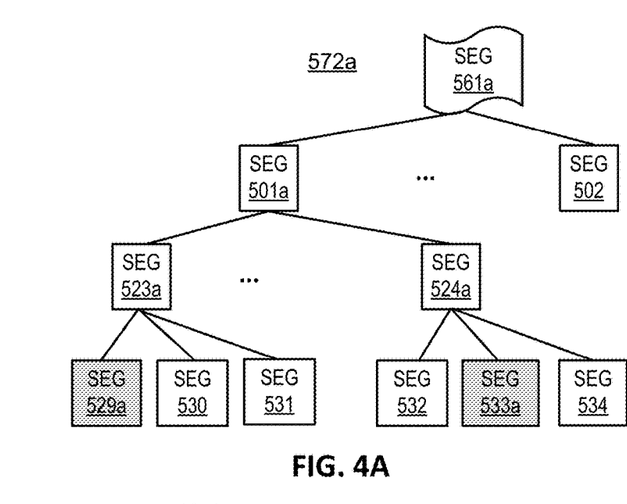
FIG. 4A illustrates an example segment tree that uses a fixed size segmentation according to an embodiment of the disclosure.
Figure 4B:
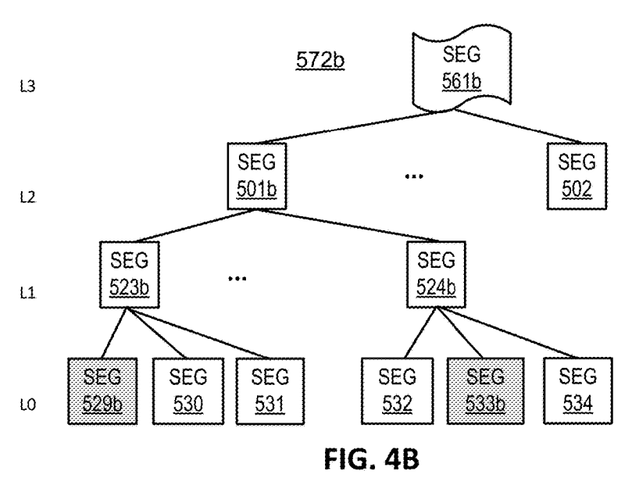
FIG. 4B illustrates an example modified segment tree of FIG. 4A according to an embodiment of the disclosure.
Figure 4C:
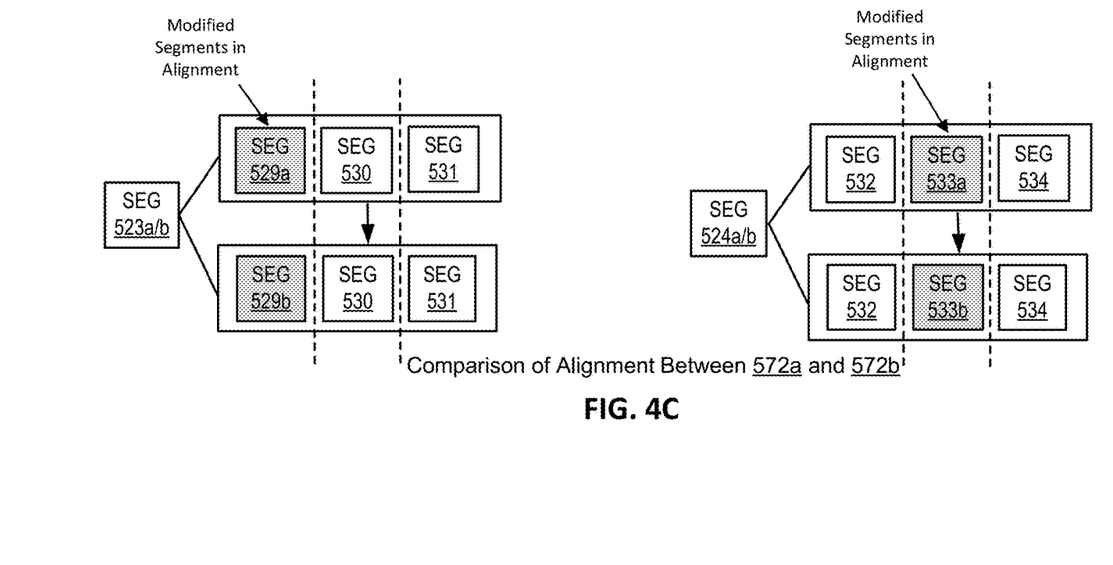
FIG. 4C illustrates an example alignment between segments within a fixed boundary using a fixed size segmentation according to an embodiment of the disclosure.

In order to potentially limit the misalignment of segments that occur when segments are modified, the system may employ fixed size segmentation as shown in the example of FIGS. 4A-4C. FIG. 4A illustrates segment tree 572a that uses a fixed size segmentation (or anchoring), and FIG. 4B illustrates segment tree for 572b that represents an update to the segment tree 572a. For example, segment tree 572a may represent a backup copy of data and segment tree 572b may represent a current version of data as modified. As shown, data segment 529a of segment 523a has been modified in as shown as 529b for segment 423b. Similarly, segments 533a for segment 424a (e.g. fingerprint) has been modified as shown as segments 533b for segment 424b. As shown, however, due to the fixed size implementation, the modified segments have not changed in size. Accordingly, as shown in FIG. 4C, the data segments corresponding to segment 523 and 524 are still in alignment. Thus, as further described herein, the system may identify only the segments within the fixed boundary of 523 and 524 that have been modified. Accordingly, only segments 529b and 533b are required to be sent to the target storage system during the replication process.

Figure 5:
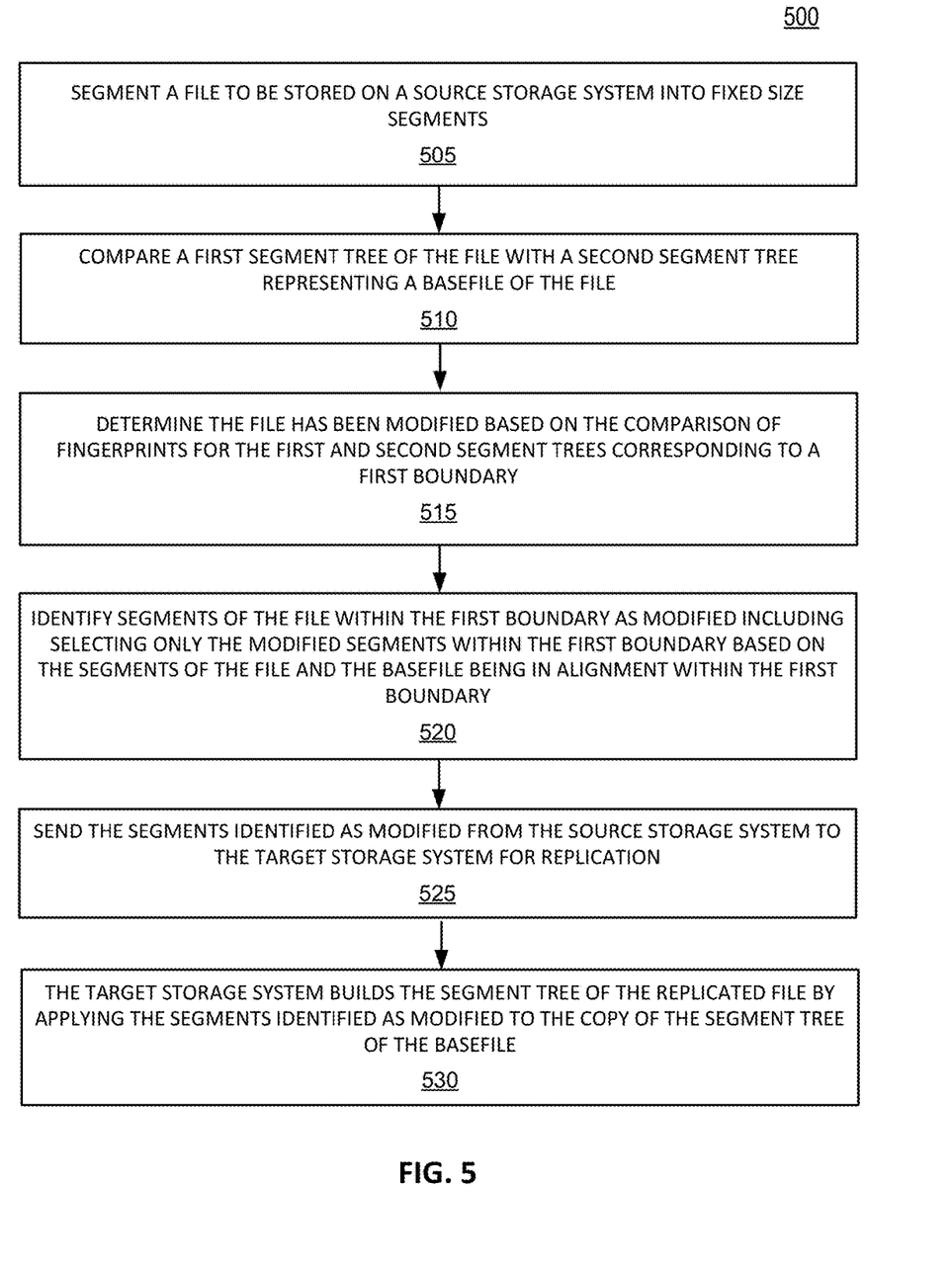
FIG. 5 is a flow diagram illustrating a method for identifying segments for sending to the source storage system to the target storage system for replication.

FIG. 5 is a flow diagram illustrating a method 500 for identifying segments for to the target storage system for replication. Method 500 may be performed by a system (e.g. system 100) or one or more components of the system (e.g. source storage system 104).

At block 505, the system may segment a file to be stored on a source storage system into fixed size segments (e.g. as represented in segment tree 201 of FIG. 2). In one embodiment, the system may segment the file into fixed size segments or variable size segments. For example, a size of the fixed-size boundary for segments may be approximately 4 megabytes, and a size of the fixed size segments may be approximately 8 kilobytes, and a size of the variable size segments may be between approximately 4-12 kilobytes.

At block 510, the system may compare a first segment tree of the file (e.g. current version of the file) with a second segment tree representing a basefile of the file (e.g. backup copy of the file), wherein the first and second segment trees each include at least a first level representing the segments of the file, and a second level representing fingerprints of segments within a fixed size boundary (e.g. as shown in FIGS. 4A and 4B). At block 515, the system may determine the file has been modified based on the comparison of fingerprints for the first and second segment trees corresponding to a first boundary.

At block 520, the system may identify segments of the file within the first boundary as modified including selecting only the modified segments within the first boundary as the segments identified as modified based on the segments of the file and the basefile of the file being in alignment within the first boundary. In one embodiment, identifying segments of the file as modified may include determining whether the file is segmented into fixed size segments or variable size segments. For example, if the file is segmented into fixed size segments, the system may select only the modified segments within the first boundary as the segments identified as modified based on the segments of the file and the basefile of the file being in alignment within the first boundary. Alternatively, if the file is segmented into variable size segments, the system may select all of the segments within the first boundary as the segments identified as modified based on the segments of the file and the basefile of the file not being in alignment within the boundary.

In one embodiment, determining whether the file is segmented into fixed size segments or variable size segments may be based on an attribute associated with the file that indicates whether the file is segmented into fixed size or variable size segments. For example, the attribute (or flag, bit, etc.) may be stored as part of the file (e.g. as metadata) or separate from the file, for example, in a reference table.

At block 525, the system may send the modified segments from the source storage system to the target storage system for replication. In one embodiment, the system may also verify the version of the segment tree at the target source. For example, if the segment tree is the same as a previous version of the source system, the source system can send the updated data to the target source, and the target source can construct or build the segment tree. Accordingly, in one embodiment, the system may send the segments identified as modified from the source storage system to a target storage system for replication in response to determining the target storage system includes a version of the basefile. For example, the target storage system may build the segment tree of the replicated file by applying the segments identified as modified to the copy of the segment tree of the basefile as shown in block 530.

Figure 6:
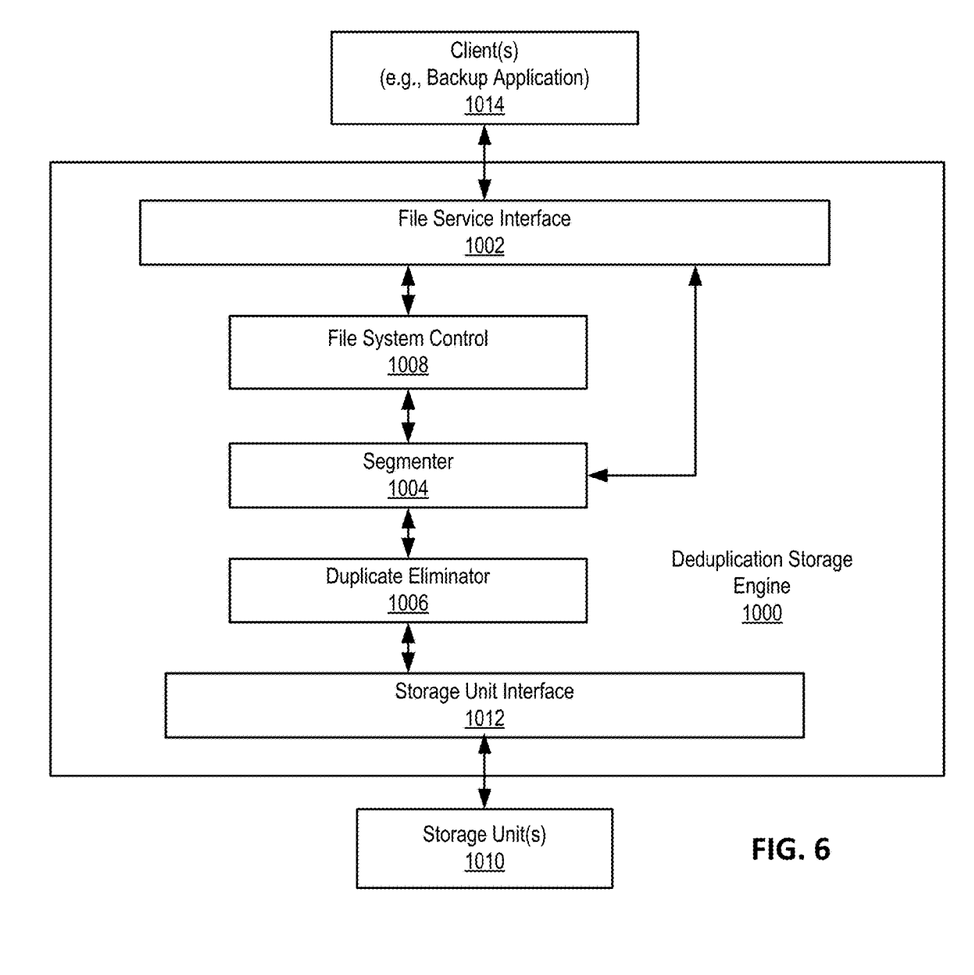
FIG. 6 is a block diagram illustrating a segment storage engine according to one embodiment of the disclosure.

FIG. 6 is a block diagram illustrating a segment storage engine according to one embodiment of the disclosure. For example, deduplication storage engine 1000 may be implemented as part of a deduplication storage system as described above, such as deduplication storage engine 107 of FIG. 1. Referring to FIG. 6, in one embodiment, deduplication storage engine 1000 includes file service interface 1002, segmenter 1004, duplicate eliminator 1006, file system control 1008, and storage unit interface 1012. Deduplication storage engine 1000 receives a file or files (or data item(s)) via file service interface 1002, which may be part of a file system namespace of a file system associated with the deduplication storage engine 1000. The file system namespace refers to the way files are identified and organized in the system. An example is to organize the files hierarchically into directories or folders. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004 breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 1008 processes information to indicate the segment(s) association with a file. In some embodiments, a list of fingerprints is used to indicate segment(s) associated with a file. File system control 1008 passes segment association information (e.g., representative data such as a fingerprint) to an index (not shown). The index is used to locate stored segments in storage units 1010 via storage unit interface 1012. Duplicate eliminator 1006 identifies whether a newly received segment has already been stored in storage units 1010. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 1010 that make up the file. Segments are then packed by a container manager (not shown) into one or more storage containers stored in storage units 1010. The deduplicated segments may be further compressed using a variation of compression algorithms, such as a Lempel-Ziv algorithm before being stored.

When a file is to be retrieved, file service interface 1002 is configured to communicate with file system control 1008 to identify appropriate segments stored in storage units 1010 via storage unit interface 1012. Storage unit interface 1012 may be implemented as part of a container manager. File system control 1008 communicates with an index (not shown) to locate appropriate segments stored in storage units via storage unit interface 1012. Appropriate segments are retrieved from the associated containers via the container manager and are used to construct the requested file. The file is provided via interface 1002 in response to the request. In one embodiment, file system control 1008 utilizes a tree (e.g., a segment tree) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

The term "approximately" may be used herein in association with a claim recitation and may be interpreted as "as nearly as practicable," "within technical limitations," and the like.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
   segmenting a file to be stored on a source storage system into segments;
   comparing a first segment tree of the file with a second segment tree of the file, the second segment tree representing a basefile of the file, wherein the first and second segment trees each include at least a first level representing the segments of the file, and a second level representing fingerprints of the segments within one or more fixed size boundaries;
   determining the file has been modified based on the comparison of fingerprints for the first and second segment trees corresponding to a first fixed size boundary of the one or more fixed size boundaries;
   identifying segments of the file within the first fixed size boundary of the first segment tree as modified based on whether the segments of the file within the first fixed size boundary and corresponding segments of the basefile are in alignment; and
   sending the segments identified as modified within the first fixed size boundary from the source storage system to a target storage system for replication.

2. The method of claim 1, wherein segmenting the file to be stored on a source storage system includes segmenting the file into fixed size segments or variable size segments.

3. The method of claim 2, wherein identifying the segments of the file as modified includes,
   determining whether the file is segmented into fixed size segments or variable size segments,
   if the file is segmented into fixed size segments, selecting only the modified segments within the first fixed size boundary as the segments identified as modified based on the segments of the file and the basefile being in alignment within the first boundary, or
   if the file is segmented into variable size segments, selecting all of the segments within the first fixed size boundary as the segments identified as modified based on the segments of the file and the basefile not being in alignment within the boundary.

4. The method of claim 3, wherein determining whether the file is segmented into fixed size segments or variable size segments is based on an attribute associated with the file that indicates whether the file is segmented into fixed size or variable size segments.

5. The method of claim 1, wherein sending the segments identified as modified from the source storage system to a target storage system for replication is performed in response to determining the target storage system includes a version of the basefile.

6. The method of claim 2, wherein the first boundary has a first predetermined size, and each of the fixed size segments has a second predetermined size.

7. The method of claim 6, wherein each of the variable size segments has a size in a predetermined range.

8. A non-transitory computer-readable medium storing instructions which, when executed by one or more processors of a computing device, cause the computing device to perform operations comprising:
   segmenting a file to be stored on a source storage system into segments;
   comparing a first segment tree of the file with a second segment tree of the file, the second segment tree representing a basefile of the file, wherein the first and second segment trees each include at least a first level representing the segments of the file, and a second level representing fingerprints of the segments within one or more fixed size boundaries;
   determining the file has been modified based on the comparison of fingerprints for the first and second segment trees corresponding to a first fixed size boundary of the one or more fixed size boundaries;
   identifying segments of the file within the first fixed size boundary of the first segment tree as modified based on whether the segments of the file within the first fixed size boundary and corresponding segments of the basefile are in alignment; and
   sending the segments identified as modified within the first fixed size boundary from the source storage system to a target storage system for replication.

9. The medium of claim 8, wherein segmenting the file to be stored on a source storage system includes segmenting the file into fixed size segments or variable size segments.

10. The medium of claim 9, wherein identifying the segments of the file as modified includes,
    determining whether the file is segmented into fixed size segments or variable size segments,
    if the file is segmented into fixed size segments, selecting only the modified segments within the first fixed size boundary as the segments identified as modified based on the segments of the file and the basefile being in alignment within the first boundary, or
    if the file is segmented into variable size segments, selecting all of the segments within the first fixed size boundary as the segments identified as modified based on the segments of the file and the basefile not being in alignment within the boundary.

11. The medium of claim 10, wherein determining whether the file is segmented into fixed size segments or variable size segments is based on an attribute associated with the file that indicates whether the file is segmented into fixed size or variable size segments.

12. The medium of claim 8, wherein sending the segments identified as modified from the source storage system to a target storage system for replication is performed in response to determining the target storage system includes a version of the basefile.

13. The medium of claim 9, wherein the first boundary has a first predetermined size, and each of the fixed size segments has a second predetermined size.

14. The medium of claim 13, wherein each of the variable size segments has a size in a predetermined range.

15. A device, comprising:
a memory storing instructions; and
a processor coupled to the memory to execute the instructions from the memory, the processor being configured to perform operations, the operations comprising:
segmenting a file to be stored on a source storage system into segments;
comparing a first segment tree of the file with a second segment tree of the file the second segment tree representing a basefile of the file, wherein the first and second segment trees each include at least a first level representing the segments of the file, and a second level representing fingerprints of the segments within one or more fixed size boundaries;
determining the file has been modified based on the comparison of fingerprints for the first and second segment trees corresponding to a first fixed size boundary of the one or more fixed size boundaries;
identifying segments of the file within the first fixed size boundary of the first segment tree as modified based on whether the segments of the file within the first fixed size boundary and corresponding segments of the basefile are in alignment; and
sending the segments identified as modified within the first fixed size boundary from the source storage system to a target storage system for replication.

16. The device of claim 15, wherein segmenting the file to be stored on a source storage system includes segmenting the file into fixed size segments or variable size segments.

17. The device of claim 16, wherein identifying the segments of the file as modified includes,
determining whether the file is segmented into fixed size segments or variable size segments,
if the file is segmented into fixed size segments, selecting only the modified segments within the first fixed size boundary as the segments identified as modified based on the segments of the file and the basefile being in alignment within the first boundary, or
if the file is segmented into variable size segments, selecting all of the segments within the first fixed size boundary as the segments identified as modified based on the segments of the file and the basefile not being in alignment within the boundary.

18. The device of claim 17, wherein determining whether the file is segmented into fixed size segments or variable size segments is based on an attribute associated with the file that indicates whether the file is segmented into fixed size or variable size segments.

19. The device of claim 15, wherein sending the segments identified as modified from the source storage system to a target storage system for replication is performed in response to determining the target storage system includes a version of the basefile.

20. The device of claim 16, wherein the first boundary has a first predetermined size, and each of the fixed size segments has a second predetermined size, and wherein each of the variable size segments has a size in a predetermined range.

* * * * *